US006776046B2

(12) United States Patent
Pistorius

(10) Patent No.: US 6,776,046 B2
(45) Date of Patent: Aug. 17, 2004

(54) PRESSURE SENSOR WITH FORESIGHTED MAINTENANCE CONTROL AND MONITORING FOR DIAPHRAGM FRACTURE AND TO A METHOD FOR MONITORING FOR DIAPHRAGM FRACTURE

(75) Inventor: Stefan Pistorius, Bad Bellingen (DE)

(73) Assignee: Endress & Hauser GmbH & Co. KG, Maulburg (DE)

( * ) Notice: Subject to any disclaimer, the term of this patent is extended or adjusted under 35 U.S.C. 154(b) by 0 days.

(21) Appl. No.: 10/192,817

(22) Filed: Jul. 11, 2002

(65) Prior Publication Data

US 2003/0024319 A1 Feb. 6, 2003

(30) Foreign Application Priority Data

Jul. 11, 2001 (DE) .......................................... 101 33 745

(51) Int. Cl.[7] ................................................ G01L 7/08
(52) U.S. Cl. ..................... 73/715; 73/718; 361/283.1; 361/283.4
(58) Field of Search ........... 73/700–756; 361/283–283.4

(56) References Cited

U.S. PATENT DOCUMENTS 5,072,190 A    12/1991  Martin 5,741,975 A  *  4/1998  Vaughn et al. ................. 73/706
5,992,240 A  * 11/1999  Tsuruoka et al. .............. 73/718

FOREIGN PATENT DOCUMENTS

| DE | 3912217 A1 | 10/1990 |
| DE | 4206675 A1 |  9/1993 |
| DE | 4416978 A1 | 11/1995 |

OTHER PUBLICATIONS

Patent Abstracts of Japan, JP 08136382 A, May 31, 1996.

* cited by examiner

*Primary Examiner*—Edward Lefkowitz
*Assistant Examiner*—Jermaine Jenkins
(74) *Attorney, Agent, or Firm*—Bacon & Thomas, PLLC

(57) ABSTRACT

A pressure-measuring device with monitoring for diaphragm fracture comprises a housing with a passage whose two openings at the end faces of the housing are closed by a first deformation body and a second deformation body. The passage is completely filled with a transmission liquid in order to transmit the process pressure from the first deformation body to the second deformation body. The device has components for monitoring a material property of the transmission liquid. A change in the material property indicates contamination by the process medium and thus a fracture of the first deformation body. The material property monitored is preferably the relative dielectric constant.

9 Claims, 3 Drawing Sheets

PRESSURE SENSOR WITH FORESIGHTED MAINTENANCE CONTROL AND MONITORING FOR DIAPHRAGM FRACTURE AND TO A METHOD FOR MONITORING FOR DIAPHRAGM FRACTURE

FIELD OF THE INVENTION

The invention relates to a pressure sensor and a method of monitoring its operation.

To be more precise, the invention relates to a pressure sensor with foresighted maintenance control and monitoring for diaphragm fracture, and to a method for monitoring for diaphragm fracture.

BACKGROUND OF THE INVENTION

During pressure measurement, a force generally acts on the surface of an elastic deformation body, a signal being produced as a function of its deformation, this signal being a measure of the applied pressure.

In capacitive pressure sensors, a movable electrode of a capacitor, for example, is displaced relative to a fixed counter-electrode by the deflection of the deformation body, and this produces a measurable change in capacitance. Planar deformation bodies such as diaphragms, plates or circular disks are especially suitable for capacitive pressure sensors, the movable electrode being applied as a coating to the planar deformation body and being arranged at a distance d parallel to the counter-electrode. In this case, pressure sensors with disks made of brittle materials, preferably ceramic disks, have proved especially successful as deformation bodies.

For certain applications, it is advantageous if the process medium does not act directly on the actual pressure sensor for producing the measuring signal but rather acts on an upstream deformation body, the deformation of which is then transmitted by means of a transmission liquid to the actual pressure sensor via a closed line system. In this case, the upstream deformation bodies are in particular metallic diaphragms.

However, these diaphragms and their joints (welds) may become porous and finally fracture on account of aging processes or corrosion, a factor which leads to contamination of the process medium with the transmission liquid. The defect described would not be noticed by the pressure sensor, since the process pressure continues to act on the actual sensor. Furthermore, there is the risk of a a bacterial center forming at the site of fracture, which is unacceptable in particular for the foodstuffs industry.

In order to avoid the consequences described, the diaphragms must be monitored in a preventative manner at regular intervals, regardless of their actual state, and if need be exchanged, This leads to an increased maintenance outlay with corresponding downtimes and costs associated therewith.

SUMMARY OF THE INVENTION

The object of the invention is to improve the conventional pressure sensors with upstream diaphragms or deformation bodies to the effect that actual aging or a fracture of the diaphragms or deformation bodies can be detected in good time.

This object achieved by the pressure-measuring device including a housing which ha a passage having a first opening and a first deformation body, which is exposed to the measuring medium and closes off the first opening and a second opening and a second deformation body, which closes off the second opening, and a transmission liquid for introducing pressure from the first deformation body to the second deformation body, a pressure sensor which based on the deflection body, produces a measuring signal, and means for monitoring a material property of the transmission liquid, by the method of recording at least one measured variable which gives an indication of the current value of a material property of the transmission liquid, of comparing the at least one recorded measured variable or a variable derived therefrom with at least one reference value, and of producing an alarm signal if the comparison results is a deviation or deviations from a reference value(s), by the program for operating on an electronic data processing system for carrying out the noted method.

The invention is based on the consideration that, in the event of a diaphragm fracture, not only does the transmission liquid escape from the pressure-measuring device, but the process medium in like manner penetrates into the pressure-measuring device and contaminates the transmission liquid. This leads to a measurable change in the characteristic properties of the liquid in the pressure-measuring device. A diaphragm fracture or a porous diaphragm can thus be verified by monitoring a suitable material property of the transmission liquid.

The relative dielectric constant $\epsilon_r$ is especially suitable for monitoring capacitive sensors. Other suitable material properties are the electrical conductivity, the thermal conductivity, the viscosity, or the absorptive capacity for electromagnetic radiation, in particular light of a certain wavelength, or the refractive index at a certain wavelength, the selection of a material property depending on the measuring principle of the respective pressure sensor.

The invention is suitable both for devices for measuring absolute pressure and relative pressure and for devices for differential-pressure measurement.

The pressure sensor is preferably a capacitive pressure sensor, in particular having a ceramic deformation body, or a polysilicon cell.

The sensor elements for the pressure measurement may be used for measuring the characteristic properties, or additional sensor elements may be provided.

In a capacitive sensor, the dielectric constant $\epsilon_r$, for example, between the electrodes for the pressure measurement may be determined, or additional electrodes may be provided.

The invention also relates to a method of monitoring for diaphragm fracture for a pressure-measuring device in which the process pressure is transmitted by means of a transmission liquid from a first deformation body designed as a diaphragm to a second deformation body.

In an especially preferred manner, the material property taken into account is the relative dielectric constant of the transmission liquid.

The invention also comprises a program for operating on an electronic data processing system for carrying out the method according to the invention.

BRIEF DESCRIPTION OF THE DRAWINGS

The invention is explained in more detail below with reference to the following drawings, in which.

DESCRIPTION OF THE PREFERRED EMBODIMENTS

Figure 1:
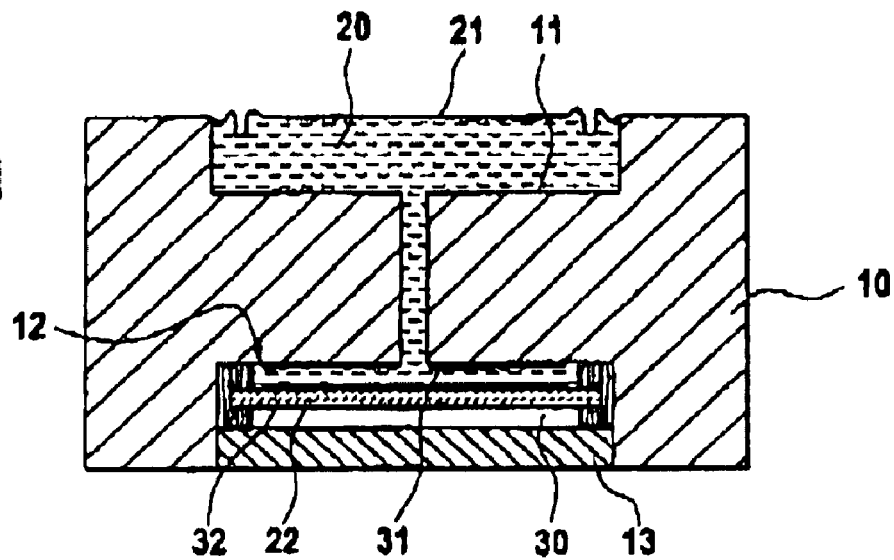
FIG. 1 shows a cross section through a first embodiment of a pressure-measuring device according to the present invention.

The invention is first of all described with reference to the exemplary embodiment in FIG. 1.

The pressure-measuring device according to the invention has a preferably essentially cylindrical housing 10 which defines, in its interior, a passage between the end faces of the housing. The passage preferably comprises a first and a second chamber 20 and 30, respectively, which are formed by recesses 11, 12 in the end faces of the housing. The chambers 20, 30 are connected to one another by means of a line. The first chamber 20 is closed by a first deformation body preferably designed as a metal diaphragm 21. The metal diaphragm 21 is arranged on the end face of the housing 10 and is exposed to the process medium during measuring operation.

The second chamber 30 is closed off by means of a second deformation body which is designed as a ceramic disk 22. The volume between the metal diaphragm 21 and the ceramic disk 22 is completely filled with an incompressible transmission liquid. During deformation of the metal diaphragm 21 by the pressure of the measuring medium, the ceramic disk 22 is likewise deflected.

The pressure sensors are preferably designed in such a way that the distance d between the electrodes under process pressure deviates from the equilibrium distance by not more than 20%, particularly preferably by not more than 10%.

In addition, a preferably planar body 13 is provided as overload protection for the ceramic disk 22. The body 13 is arranged parallel to and at a distance from the outside of the ceramic disk 22, the distance being selected in such a way that the ceramic disk 22 comes into contact with the body 13 during a critical deflection. As a result, the deflection is limited.

In this exemplary embodiment, an electrode 32, at a distance from the counter-electrode 31, is applied to that surface of the ceramic disk 22 which faces the housing interior.

A deflection of the ceramic disk 22 under pressure produces an increase in distance between the two electrodes 31 and 32 of the capacitive pressure sensor, this increase in distance being accompanied by a decrease in the capacitance C, since the capacitance is in inverse proportion to the distance.

In addition, the capacitance C is proportional to the relative dielectric constant of the medium between the electrodes, that is of the transmission liquid.

In the event of a defective diaphragm 21, the transmission liquid may be contaminated by the process medium, a factor which leads to a change in the relative dielectric constant and thus in the capacitance. This effect is shown concisely in FIG. 5 for contamination of oil ($\epsilon_r$=2.5) with water ($\epsilon_r$=80).

The diagram shows the relative capacitance of a sensor capacitor as a function of the deformation, i.e. of the relative increase in the distance d between the electrodes. Curves for different degrees of impurity are specified, in which case all the capacitance values have been standardized with the capacitance for pure oil and no deformation.

It has been found that contamination of just a few percent leads to considerable displacement of the capacitance band, which displacement cannot be explained by a deformation on account of a pressure change.

In the exemplary embodiment in FIG. 1, an electronic control arrangement (not shown) is provided in the simplest case, this control arrangement, when a capacitance ratio above a critical value C>$C_{crit}$ occurs, emitting a signal which indicates the need for a diaphragm exchange.

In a further embodiment, a control unit is provided which converts the currently measured capacitance ratio into an interval of possible contamination values, in which case the relative dielectric constants of the respective process medium and of the transmission liquid are to be taken into account here as parameters. With the aid of the contamination values, a decision can then be made as to when an exchange is necessary.

By plotting the contamination determined against the operating time, the aging behavior of the diaphragm 21 can be determined for a given process environment, as a result of which the point in time actually required for maintenance can be optimized.

Figure 2A:
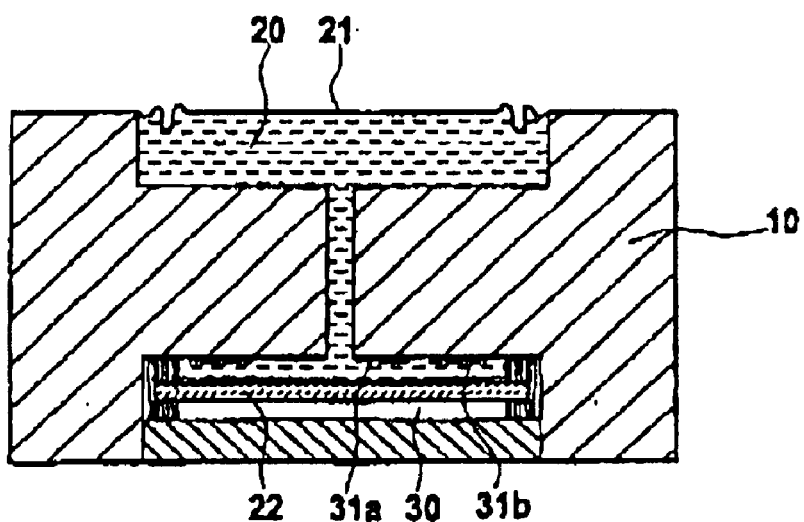
FIG. 2a shows a cross section through a second embodiment of a pressure-measuring device according to the present invention.
Figure 2B:
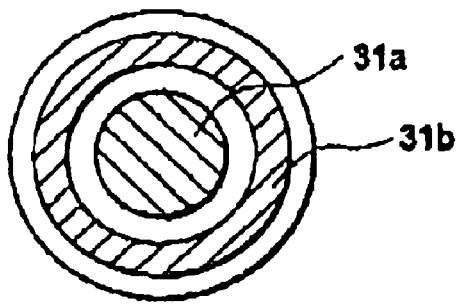
FIG. 2b shows a plan view of the counter-electrodes, a cross section through a second embodiment of an absolute-pressure sensor according to the present invention.

A further exemplary embodiment of a pressure-measuring device according to the present invention is shown in FIGS. 2a and 2b. The device has essentially the same construction as the device in FIG. 1 and the same components are provided with the same reference numerals.

The essential difference consists in the construction of the counter-electrode, which comprises at least two partial electrodes 31a and 31b isolated from one another. The partial electrodes may in principle have any desired shapes and surface ratios.

As shown in the plan view of the counter-electrode in FIG. 2b, the partial electrodes 31a and 31b are preferably concentric and equal in area. The annular construction of the counter-electrode is known per se. It is selected according to the prior art in order to distinguish between capacitance changes on account of the thermal expansion of the sensor housing and capacitance changes on account of the deflection of the ceramic disk under process pressure. In this case, the partial electrodes 31a and 31b each form a capacitor with the electrode 32 on the ceramic disk as counter-electrode. Thermal expansion of the sensor housing leads essentially to the same changes in distance at both capacitors with the capacitances $C_{inside}$ and $C_{outside}$. However, the deflection of the ceramic disk produces greater changes in distance for the inner capacitor. The pressure-measuring device therefore determines a pressure change $\delta P$ as a function of the change in both capacitance values:

$$\delta P = \delta P[(\delta C_{inside} - \delta C_{outside})/(\delta C_{inside} + \delta C_{outside})]$$

According to the invention, the pair of partial electrodes 31a and 31b are now connected as monitoring capacitor, the capacitance $C_m$ of which depends on the geometry of the partial electrodes 31a and 31b and on the dielectric constant of the medium between the partial electrodes. Provided the geometry of the partial electrodes is invariable, each capacitance change can be interpreted directly as a change in the dielectric constant and thus as contamination of the transmission liquid.

In one embodiment, an electronic control unit is provided which periodically determines the capacitance $C_m$.

Figure 5:
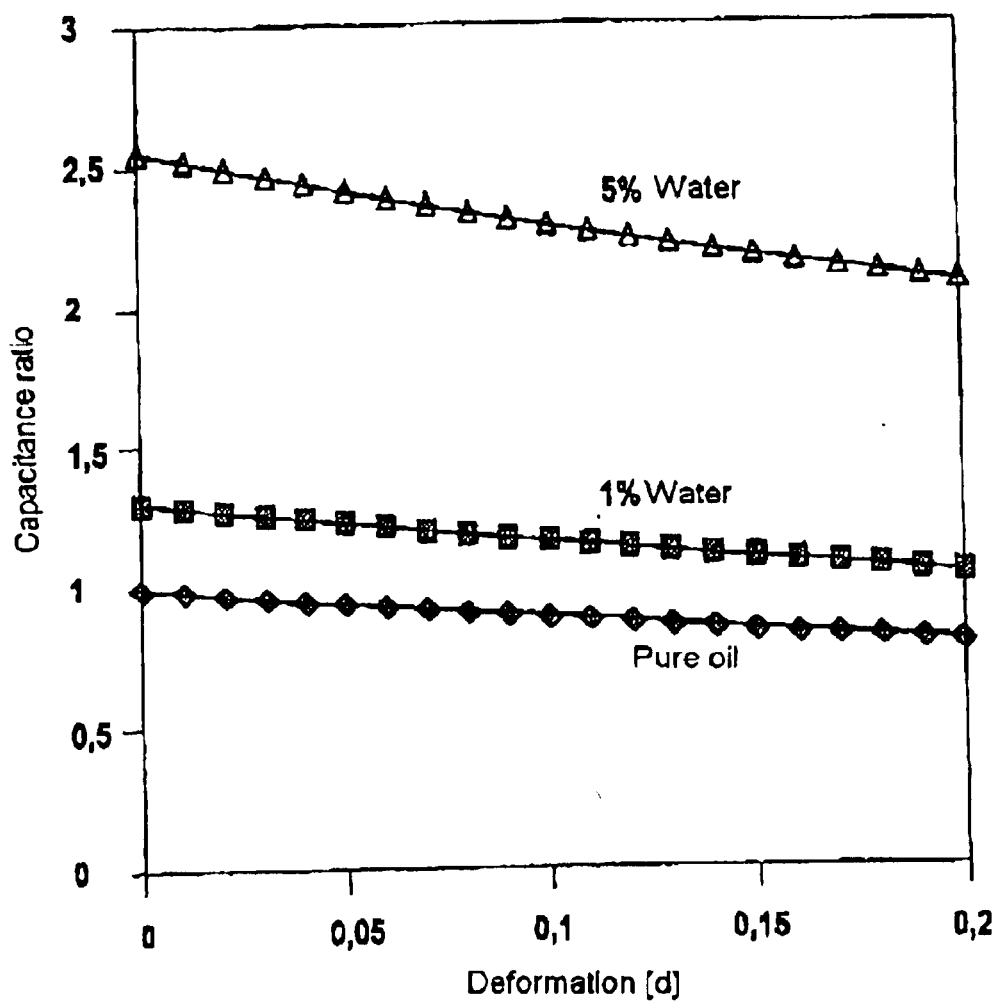
FIG. 5 shows the change in the capacitance band of a pressure sensor with a defective diaphragm.

In another embodiment, an electronic control unit only determines the capacitance $C_m$ for monitoring purposes if, during the measurement of the capacitances $C_{inside}$ and $C_{outside}$, values are obtained which give rise to the supposition that the capacitance range has been displaced on account of contamination, as was discussed in connection with FIGS. 1 and 5.

Figure 3:
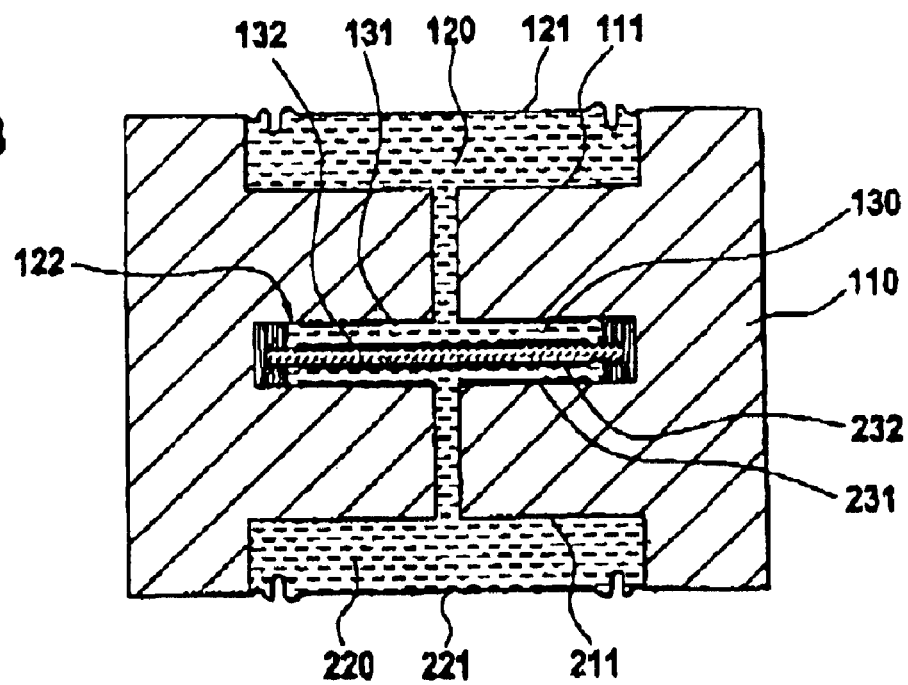
FIG. 3 shows a cross section through an embodiment of a differential-pressure sensor according to the present invention.

The principle of the present invention may also be used in the case of a differential-pressure sensor. A differential-pressure sensor according to the invention is shown in FIG. 3. The sensor comprises the housing 110 with the two diaphragms 121 and 221 for sensing the respective process pressure at the two end faces of the housing 110. The two diaphragms 121, 221 in each case close the chambers 120, 220 in the housing end faces, from which chambers 120, 220 a passage leads to a central chamber 130 in each case. Arranged in the central chamber 130 is a deformation body 122 which is preferably designed as a ceramic disk. The deformation body 122 blocks the passage between the end faces of the housing 110. The two partial volumes between the deformation body 122 and the two metal diaphragms 121, 221 at the end faces of the housing are completely filled with a transmission liquid. If there is a pressure difference dP between the two end faces of the housing 110, the deformation body 122 is deflected. An electrode 132, 232 is in each case provided on the two surfaces of the deformation body 122. Each of these electrodes 132, 232 in each case forms a capacitor with a corresponding counter-electrode 131, 231. The capacitances $C_1$ and $C_2$ of the two capacitors are correlated with one another, since an increase in the electrode distance on the one side is accompanied by a decrease in the electrode distance on the other side. In this case, a deviation from the correlation indicates the contamination of the transmission liquid in one of the two cells.

Of course, partial electrodes may also be provided for temperature monitoring in a differential-pressure sensor, as shown, for example, in FIG. 2b. In this case, changes in the pressure difference δdP would have to be identified as $\delta dP_1 = -\delta dP_2$, where:

$$\delta dP1 = \delta dP1[(\delta C_{1inside} - \delta C_{1outside})/(\delta C_{1inside} + \delta C_{1outside})] \text{ and}$$

$$\delta dP2 = \delta dP2[(\delta C_{2inside} - \delta C_{2outside})/(\delta C_{2inside} + \delta C_{2outside})]$$

A deviation from the condition $\delta dP_1 = -\delta dP_2$ would again indicate contamination of the transmission liquid, which contamination can be verified with a suitable control unit.

In the embodiments described above, the ceramic disk of the capacitive pressure sensor is arranged in a recess of the housing. In alternative configurations of these embodiments, the ceramic disk is not arranged in a recess but on the end face of a housing. An overload protection is provided on the rear side of the ceramic disk. In this case, the distance between the two surfaces of the ceramic disk and the surface of the housing and of the overload protection is preferably controlled via the thickness of the fastening means which connect said components to one another. Suitable fastening means are, in particular, solder rings (preferably active solder rings) or a glass joint.

Figure 4:
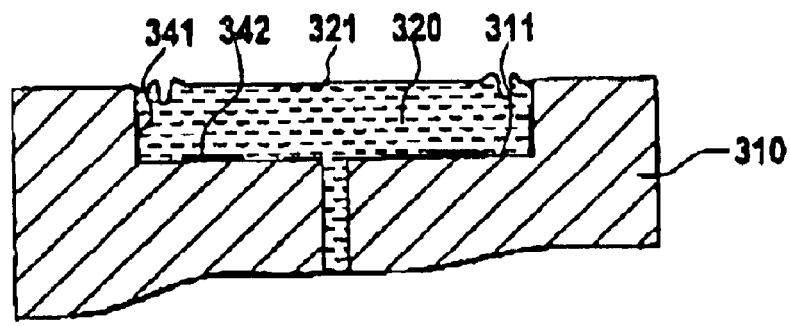
FIG. 4 shows a partial cross section of a further embodiment of the present invention.

FIG. 4 shows a detail of a further exemplary embodiment, namely a cross section through an end region of a housing 310. The end face of the housing has a recess 311 which is closed off by a deformation body 321. The recess is connected via a passage to a second deformation body and any desired pressure-measuring device. The volume between the deformation bodies is filled with a transmission liquid.

Provided in the volume is a pair of electrodes 341, 342 which form a capacitor, the capacitance of which depends on the electrode geometry and on the relative dielectric constant of the medium between the electrodes. Provided the electrode geometry is constant, the capacitance measurement provides a measure of a change in the dielectric constant and thus in the contamination of the transmission liquid.

The electrode pair is preferably designed as an annular electrode pair which is positioned in the immediate vicinity of the deformation body to be monitored. In this way, a defect in the diaphragm can be detected in good time even when long diffusion times are to be expected for the process medium in the transmission liquid.

For all the embodiments, it is advantageous to minimize the volume trapped between the deformation bodies. To this end, the chambers may be of flat configuration and the passage or the lines between the chambers may be capillaries.

The control arrangement of the pressure-measuring devices according to the invention may comprise an electronic circuit which is mounted on the sensor housing and is preferably realized as an integrated circuit.

In general, it is expedient to select the transmission liquid in such a way that it differs sufficiently from the process medium with regard to the material property monitored.

What is claimed is:

1. A pressure-measuring device, comprising:

a housing having a passage defining a first opening and a second opening;

a metal diaphragm exposed to a measuring medium and situated to close off said first opening;

a deformation body situated to close off said second opening;

transmission liquid situated between said metal diaphragm and said deformation body for communicating pressure at said metal diaphragm to said deformation body;

a capacitive pressure sensor situated in said housing which produces a measuring signal based upon a deflection of said deformation; and means for monitoring a material property of said transmission liquid, said means for monitoring being means for monitoring the relative dielectric constant $\epsilon_r$ of said transmission liquid and being adapted to produce a signal indicating fracture of said metal diaphragm if said material property changes beyond a tolerance value.

2. The device as defined in claim 1, wherein:

said deformation body has a disk made of a brittle material.

3. The device as defined in claim 2, wherein:

said disk made as a ceramic disk having a high proportion of $Al_2O_3$.

4. The device as defined in claim 1, wherein:

said means or monitoring comprising an electronic control arrangement which determines the relative dielectric constant $\epsilon_r$ with reference to the pressure-dependent capacitance of said capacitive pressure sensor.

5. The device a defined in claim 1, wherein:

said means or monitoring comprising at least two electrodes which are arranged in an essentially pressure-independent geometrical relationship to one another, with the capacitance between said electrodes serving to monitor the relative dielectric constant $\epsilon_r$.

6. The device a defined in claim 1, wherein:
said capacitive pressure sensor is an absolute-pressure sensor.

7. The device a defined in claim 1, wherein:
said capacitive pressure sensor is a differential-pressure sensor.

8. A method of monitoring for diaphragm fracture for the diaphragm of a pressure-measuring device in which the process pressure is transmitted by means of transmission liquid from a metal diaphragm to a deformation body of the device, the method comprising the steps of:

recording at least one measured variable which gives an indication of the current value of a material property of the transmission liquid;

establishing at least one reference value fo the measured variable;

comprising said at least one recorded measured variable, or a variable derived therefrom with said established at least one reference value; and producing an alarm signal if the comparison results in a deviation or deviations from the reference value or reference values, wherein:

the material property is the relative dielectric constant $\epsilon_r$ of the transmission liquid.

9. A program for operating on an electronic data processing system for carrying out the method as defined in claim 8.

* * * * *